(12) United States Patent
Sinclair (10) Patent No.: US 7,136,973 B2
(45) Date of Patent: Nov. 14, 2006

(54) DUAL MEDIA STORAGE DEVICE

(75) Inventor: Alan Welsh Sinclair, Maddiston (GB)

(73) Assignee: SanDisk Corporation, Milpitas, CA (US)

( * ) Notice: Subject to any disclaimer, the term of this patent is extended or adjusted under 35 U.S.C. 154(b) by 240 days.

(21) Appl. No.: 10/772,855

(22) Filed: Feb. 4, 2004

(65) Prior Publication Data

US 2005/0172074 A1 Aug. 4, 2005

(51) Int. Cl.
*G06F 12/00* (2006.01)

(52) U.S. Cl. ........................ 711/156; 711/100; 711/103; 711/111; 711/118; 711/154; 711/158

(58) Field of Classification Search ................ 711/156, 711/100, 103, 111, 118, 154, 158
See application file for complete search history.

(56) References Cited

U.S. PATENT DOCUMENTS

| | | | | |
|---|---|---|---|---|
| 4,896,262 A * | 1/1990 | Wayama et al. ............... 710/65 |
| 5,542,066 A | 7/1996 | Mattson et al. ............. 711/136 |
| 5,544,356 A | 8/1996 | Robinson et al. |
| 5,586,291 A | 12/1996 | Lasker et al. ................ 711/113 |
| 5,636,355 A | 6/1997 | Ramakrishnan et al. ..... 711/113 |
| 5,708,846 A | 1/1998 | Ryan |
| 5,754,888 A | 5/1998 | Yang et al. |
| 5,778,418 A | 7/1998 | Auclair et al. ............... 711/101 |
| 5,798,968 A | 8/1998 | Lee et al. .............. 365/185.29 |
| 5,890,192 A | 3/1999 | Lee et al. .................... 711/103 |
| 6,016,530 A | 1/2000 | Auclair et al. .................. 711/6 |
| 6,286,056 B1 * | 9/2001 | Edgar et al. .................... 710/5 |
| 6,286,256 B1 | 9/2001 | Weder |
| 6,370,614 B1 * | 4/2002 | Teoman et al. ............. 711/113 |
| 6,408,357 B1 | 6/2002 | Hanmann et al. |
| 6,424,486 B1 | 7/2002 | Heaton et al. |
| 6,631,456 B1 * | 10/2003 | Leighnor et al. ........... 711/170 |
| 6,646,948 B1 | 11/2003 | Stence et al. |
| 6,728,851 B1 * | 4/2004 | Estakhri et al. ............. 711/168 |
| 6,898,662 B1 * | 5/2005 | Gorobets .................... 711/103 |
| 2001/0052038 A1 | 12/2001 | Fallon et al. |
| 2002/0069354 A1 | 6/2002 | Fallon et al. |
| 2002/0083280 A1 | 6/2002 | Naitoh et al. ............... 711/158 |
| 2005/0125600 A1 | 6/2005 | Ehrlich |
| 2005/0125602 A1 | 6/2005 | Enrlich |

FOREIGN PATENT DOCUMENTS

| | | |
|---|---|---|
| EP | 0702305 A1 | 2/1996 |
| WO | WO97/50035 | 12/1997 |
| WO | WO02/058074 A2 | 7/2002 |

OTHER PUBLICATIONS

PCT International Search Report and Written Opinion dated Jun. 6, 2005.
PCT Search Report and Written Opinion from International Application No. PCT/US2005/000275.
Office Action of Mar. 24, 2006 from Application No. 10/772,789.

* cited by examiner

*Primary Examiner*—Stephen C. Elmore
(74) *Attorney, Agent, or Firm*—Beyer Weaver & Thomas, LLP (57) ABSTRACT

A dual media storage device is provided. Two separate non-volatile mass storage devices, one having a faster access time and a lower capacity than the other, are combined into a single system. A storage controller can direct the flow of data into one device or the other, depending upon various conditions, which might include one mass storage device being unavailable or for certain caching schemes.

18 Claims, 5 Drawing Sheets

DUAL MEDIA STORAGE DEVICE

CROSS-REFERENCE TO RELATED APPLICATIONS

This application is related to the co-pending U.S. Patent Application titled "Mass Storage Accelerator," Ser. No. 10/772,789, filed 4 Feb. 2004 and having an attorney reference number of SDK1P019, hereby incorporated herein by reference in its entirety and for all purposes.

BACKGROUND OF THE INVENTION

1. Field of the Invention

The present invention relates generally to data storage devices, and more specifically to dual media storage devices.

2. Description of the Related Art

General-purpose computers require a mass storage system. Unlike main memory, which is used for the direct manipulation of data, mass storage is used to retain data. Generally a program is stored in mass storage and, when the program is executed, either the entire program or portions of the program are copied into main memory. The speed at which a system is able to locate and transfer the program and its associated data from the mass storage device into the main memory is integral to the overall speed of a system.

Common mass storage devices include floppy disks, hard disks, optical discs and tapes. Each device has both strengths and weaknesses, which can relate to capacity, price, speed and portability.

Additionally, other devices, such as flash memory, can provide non-volatile storage. Flash memory is a type of electrically erasable programmable read-only memory (EEPROM). Although flash memory is typically not as fast as the volatile main memory, it is faster than hard disks.

The inventor has previously explored the concept of merging separate devices into a single mass storage system in order to maximize each device's strengths and minimize each device's weaknesses. For example, the inventor was also identified as the inventor for PCT application "Memory Device" WO 97/50035 that was published on Dec. 31, 1997, incorporated herein by reference for all purposes. That PCT application described a memory system that included both a relatively slow-access mass data storage device, such as a hard disk, and a relatively fast-access data storage device, such as flash memory. A similar concept has been explored in the U.S. patent, "Mass Computer Storage System Having Both Solid State and Rotating Disk Types of Memory," U.S. Pat. No. 6,016,530, issued to Daniel Auclair and Eliyahou Harari on Jan. 18, 2000, incorporated herein by reference in its entirety for all purposes.

By combining a non-volatile flash memory device with a non-volatile hard disk, a resulting mass storage system can be greater than the sum of its parts. However, such memory system was specifically limited to a situation where only one version of each data sector was ever maintained. The data sector was stored in either the high-speed memory or in the slow-access mass data storage device, making the logical address space equal to the sum of the capacities of the high-speed memory and the slow-access mass storage device.

There are many commercially successful non-volatile memory products being used today that employ an array of flash cells formed on one or more integrated circuits chips. A memory controller, usually (but not necessarily) on a separate integrated circuit chip, controls operation of the memory array. Such a controller typically includes a microprocessor, some non-volatile read-only memory (ROM), a volatile random-access memory (RAM) and one or more special circuits such as one that calculates an error-correction-code (ECC) from data as it passes through the controller during programming and reading operations.

Memory cells of a typical flash array are divided into discrete blocks of cells that are erased together. That is, the erase block is the erase unit—a minimum number of cells that are simultaneously erasable. Each erase block typically stores one or more pages of data, the page programmed or read in parallel in different sub-arrays or planes. Each planes typically stores one or more sectors of data, the size of the sector being defined by the host system. An example sector includes 512 bytes of user data, following a standard established with magnetic disk drives. Such memories are typically configured with 16, 32 or more pages within each erase black, and each page stores one or just a few host sectors of data.

In order to increase the degree of parallelism during programming and reading operations the array is typically divided into sub-arrays, commonly referred to as planes. Each plane can contain its own data registers and other circuits to allow parallel operation such that the sectors of data may be programmed to or read from all the planes simultaneously. An array on a single integrated circuit may be physically divided into planes, or each plane may be formed from a separate one or more integrated circuit chips. Examples of such a memory implementation are described in U.S. Pat. No. 5,798,968, "Plane decode/virtual sector architecture," issued to Lee et al. on Aug. 25, 1998, and U.S. Pat. No. 5,890,192, "Concurrent write of multiple chunks of data into multiple subarrays of flash EEPROM," issued to Lee et al. on Mar. 30, 1999, both of which incorporated herein by reference in their entireties for all purposes.

To further efficiently manage the memory, erase blocks may be linked together to form virtual blocks or metablocks. That is, each metablock is defined to include one erase block from each plane. Use of the metablock is described in international patent application "Partial Block Data Programming And Reading Operations In A Non-Volatile Memory," publication no.: WO02/058074 on Jul. 25, 2002, incorporated herein by reference in its entirety for all purposes. The metablock is identified by a host logical block address as a destination for programming and reading data. Similarly, all erase blocks of a metablock are erased together. The controller in a memory system operated by such large blocks and/or metablocks performs a number of functions including the translation between logical block addresses (LBAs) received from a host, and physical block numbers (PBNs) within the memory cell array. Individual pages within the blocks are typically identified by offsets within the block address.

Flash memory systems of this type are commonly used as mass storage devices in portable applications. The flash memory device communicates with a host system via a logical interface using a protocol such as ATA, and is frequently in the form of a removable card. Some of the commercially available cards are CompactFlash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication systems, and similar types of equipment. Besides the memory card implementation, this type of memory can alternatively be embedded into various types of host systems.

In the past, flash memory has been used for various data caching functions, for storage of a computer's BIOS, or as an extension of a mass storage device (as in the above PCT application). It has been used within a hard disk device for caching write or read data. For example, U.S. Pat. No. 5,586,291, "Disk controller with volatile and non-volatile cache memories," to Lasker et al. on Dec. 17, 1996, incorporated herein by reference in its entirety for all purposes, describes the use of a non-volatile memory as a write cache for a hard disk, with data mirrored in a volatile memory that acts as a read cache. U.S. Pat. No. 5,636,355, "Disk cache management techniques using non-volatile storage," to Ramakrishnan et al. on Jun. 3, 1997, and U.S. Pat. No. 5,542,066, "Destaging modified data blocks from cache memory," to Mattson et al. on Jul. 30, 1996, both of which are incorporated herein by reference in their entireties for all purposes, also describe use on non-volatile memory as a write cache for a hard disk, and purging or destaging algorithms for moving data from the cache to the hard disk. In known applications of non-volatile memory as a disk cache, data identified by a logical address in the hard drive is temporarily mapped to a physical location in the non-volatile memory.

There are continuing efforts to improve mass storage devices.

SUMMARY OF THE INVENTION

The present invention provides a data storage system that can include two non-volatile mass storage devices and a storage controller. The second non-volatile mass storage device has a faster access time and a lower capacity than the first non-volatile mass storage device. The two non-volatile mass storage devices have overlapping address ranges. In other words, any piece of data might be simultaneously available on both mass storage devices.

In one aspect, the first non-volatile mass storage device can be placed in an available state and an unavailable state. When the first mass storage device is in its unavailable state, the storage controller only accesses the second mass storage device. An unavailable state might mean the device is physically unavailable (e.g., removed) or simply that the storage controller simply will not access it until it is placed back in an available state. When the first mass storage device is in the available state, the storage controller is operable to access either the first mass storage device or the second mass storage device.

In another aspect, the storage controller directs incoming data into either the first non-volatile mass storage device or the second non-volatile mass storage device. If data is directed into the second mass storage device, then the data is later copied from the second mass storage device into the first mass storage device. The storage controller's choice of which non-volatile mass storage device to direct incoming data into is at least partially dependant upon the amount of data in the second non-volatile mass storage device that has not been copied into the first non-volatile storage device.

In another aspect, the storage controller satisfies external data requests with data that is stored in either the second non-volatile mass storage device or, if the requested data is not present in the second non-volatile mass storage device, with data that is stored in the first non-volatile mass storage device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention may best be understood by reference to the following description taken in conjunction with the accompanying drawings, in which.

It is to be understood that, in the drawings, like reference numerals designate like structural elements. Also, it is understood that the depictions in the FIGs. are not necessarily to scale.

DETAILED DESCRIPTION OF THE PREFERRED EMBODIMENTS

In the following description, numerous specific details are set forth to provide a thorough understanding of the present invention. However, it will be apparent to one skilled in the art that the present invention may be practiced without some or all of these specific details. In other instances, well known process steps have not been described in detail in order to avoid unnecessarily obscuring the present invention.

The present invention generally improves upon prior mass storage devices, also commonly called auxiliary memory, by combining two separate mass storage devices, each having its own strengths and weaknesses. For example when a flash mass storage device ("flash memory system") is compared to a hard drive, the flash memory system is more resistant to shock and more desirable for portable applications because it can operate without moving parts. Although the flash memory system has a faster access time than a hard drive, it generally does not have the storage capacity of an equivalently priced hard drive. Additionally, the flash memory system typically requires periodic garbage collection operations performed that renders the flash memory system inaccessible for a period of time. The improved mass storage device of the present invention uses either a flash memory system or a hard drive depending upon which device is more suitable for a certain circumstance. As will be appreciate by those skilled in the art, any two non-volatile mass storage devices can be used in the present invention as long as one has a faster access time and a lower capacity than the other.

Several different advantages can be gained with the improved mass storage device. In one embodiment, the improved mass storage device can provide for fast system boot and fast application start-up. Information required by a host system during its boot process, such as operating system and configuration files, can be stored in the flash memory system, with a second copy optionally being stored in the hard drive. In such a system, the flash memory system can be used as a non-volatile read cache, and its fast random read access characteristics allow much faster system start-up. This information can initially be identified as being frequently read information and can be copied to the flash memory system during its initial access from the hard drive. Such information can be protected to prevent it being overwritten by other applications that use the flash memory system in the mass storage device. Application software files can be treated in the same way to provide fast start-up of applications.

In another embodiment, the improved mass storage device can act as a low-power storage device. The improved mass storage device can use the flash memory system as a read/write cache by maintaining a copy of recerity accessed information in the flash memory system, together with a copy of recently written information. The device can then spin down the magnetic hard disk to reduce power in portable applications and take advantage of the low power characteristics of flash memory, while retaining a high probability of fast response for required information by means of a cache hit in flash memory.

Similarly, the improved mass storage device can also provide the advantage of being a shock-tolerant storage device. Spinning down the magnetic hard disk when in an environment with a risk of high mechanical shock, would take advantage of the high shock tolerance of semiconductor memory, while retaining an operating capability with the information stored in the flash memory system.

Yet another potential advantage of the improved mass storage device is its ability to provide a highly reliable storage device with short-term backup. If the flash memory system maintains recently written information in the flash memory system as a write cache, the information is retained in the flash memory system even after it is transferred to the hard drive. If the information is maintained for as long as possible, and is only overwritten when space is required, then the write cache provides the security of a second copy of recently written information. The improved mass storage device can, therefore, result in a reliable storage device that uses the high shock tolerance of semiconductor memory to protect against loss, due to mechanical failure such as a disk crash, of recently written information that has not yet been backed up.

Figure 1A:
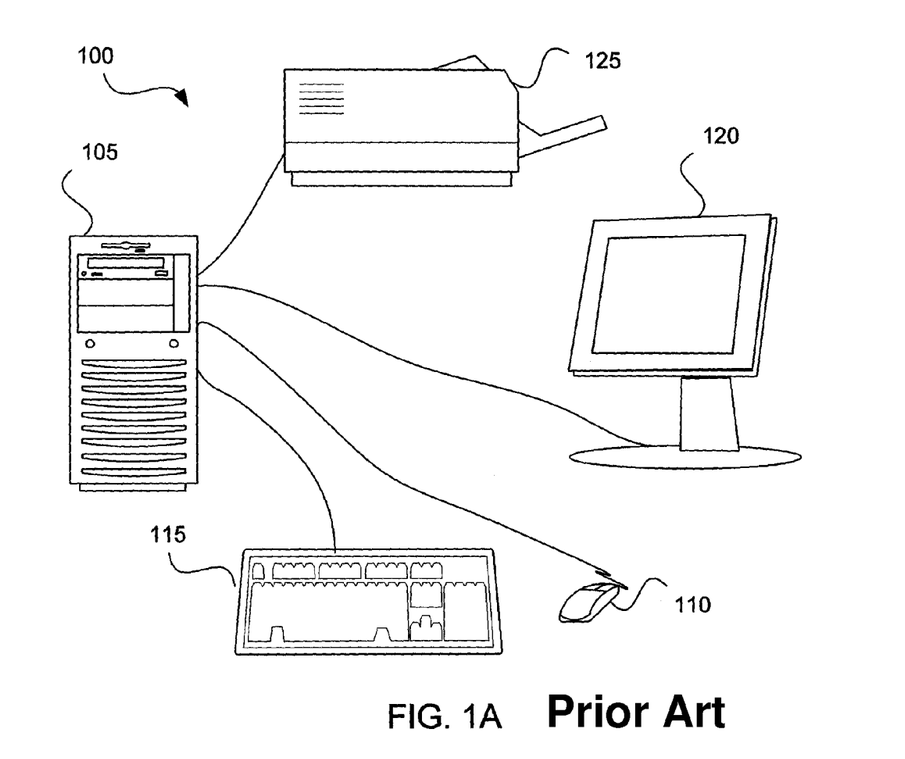
FIG. 1A depicts an exemplary general-purpose computer system that can utilize the invention.

FIG. 1A depicts an exemplary general-purpose computer system 100 that can utilize the current invention. Components include a computer 105, various input devices such as a mouse 110 and keyboard 115, and various output devices such as a monitor 120 and a printer 125.

Figure 1B:
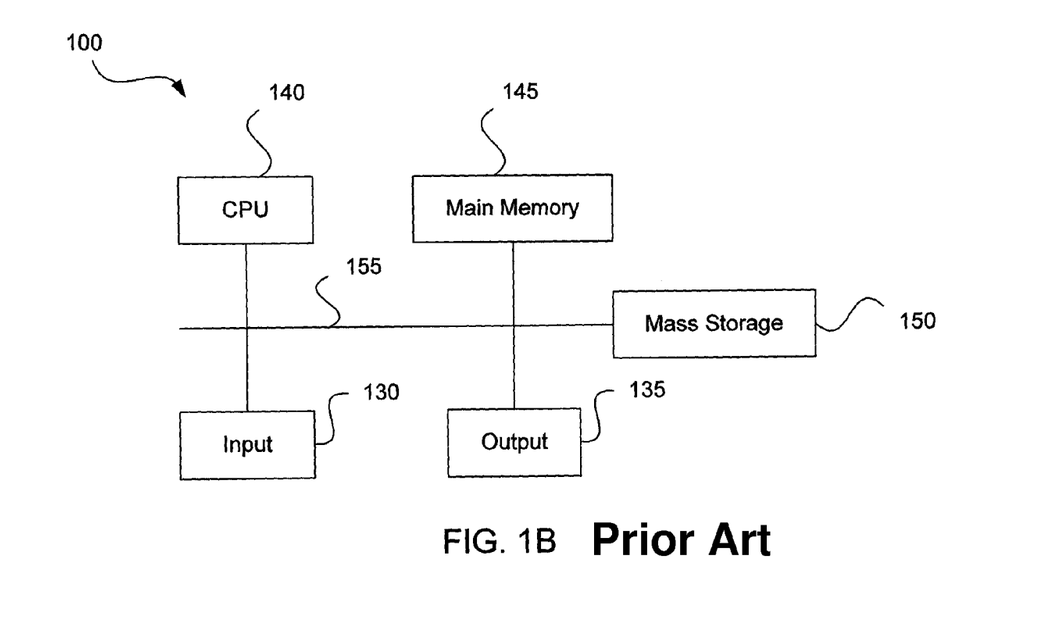
FIG. 1B depicts an abstracted representation of the general-purpose computer system of FIG. 1A.

FIG. 1B depicts an abstracted representation of a computer system 100 of FIG. 1A that depicts its essential components. A single component 130 represents input devices that allow a user to interact with the computer system 100, such as a mouse and keyboard. Similarly, a single component 135 represents the output devices that display what the computer system 100 has accomplished, such as a monitor and printer. The heart of the computer system 100 is a central processing unit (CPU) 140, and is the component that executes instructions. Main memory 145 is typically volatile and provides the CPU 140 with both the instructions to be executed and data to be manipulated by the instructions. These components 130, 135, 140, and 145 are all well known in the art.

An improved mass storage device 150 allows the computer system 100 to permanently retain large amounts of data. The components 130, 135, 140, 145, and 150 are able to exchange information with each other via a host bus 155.

Figure 2A:
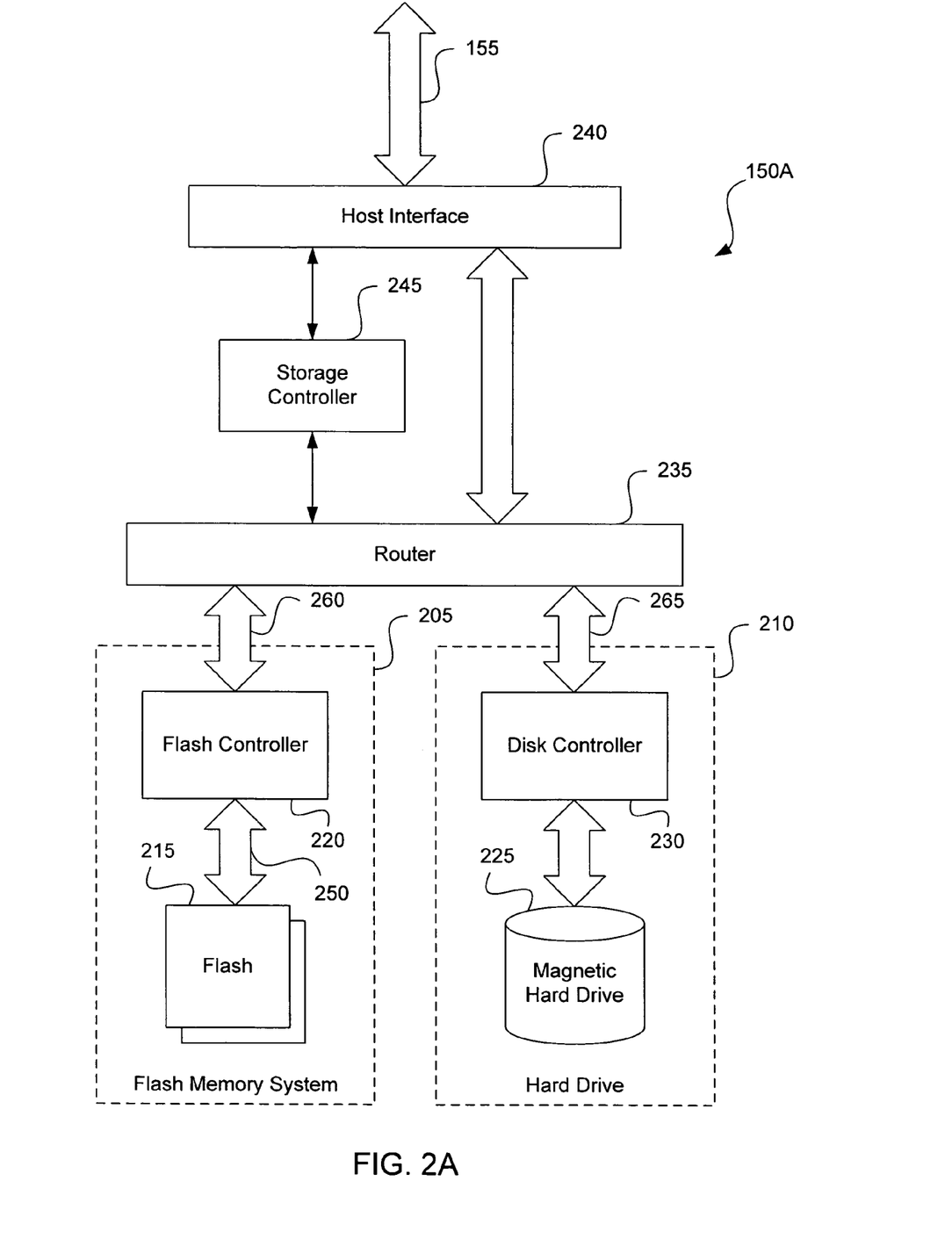
FIG. 2A depicts the improved mass storage device according to an exemplary embodiment of the present invention.

FIG. 2A depicts an improved mass storage device 150A according to an exemplary embodiment of the present invention. Two mass storage devices, a flash memory system 205 and a hard drive 210 are connected in parallel. The flash memory system 205 includes a flash memory array 215 and a flash controller 220. The hard drive 210 includes a magnetic hard disk 225 and a disk controller 230. Each controller 220 and 230 is in charge of the operations specific to the respective memory type. For example, the flash controller 220 controls all logical-to-physical mapping of data sectors and all flash memory management such that the interface 250 between the flash controller 220 and the flash memory array 215 is a physical interface. The disk controller 230 manages operation of the magnetic hard disk 225 for reading and writing. Both controllers 220 and 230 connect to a router 235 via logical interfaces 260 and 265.

In another embodiment, the functions of the controllers 220 and 230 merged together with router 235, in an integrated controller device. This device may also include storage controller 245 and host interface 240. However, such a configuration would require the production of new controller units. Accordingly, either one or both of the controllers 220 and 230 would simply not be included in the memory devices. While such a configuration would require new control circuitry to be developed, it may also reduce the number of total components that are required.

In FIG. 2A, a host interface 240 and a storage controller 245 are both positioned upstream from the router 235, which allows data and control information to be passed in either direction between the host interface 240 and either the disk controller 230 or the flash controller 220. Additionally, the router 235 can control transfer of data in either direction between the disk controller 230 and the flash controller 220. Such transfers can be done as a stand-alone operation. Alternatively, such transfers can be done in conjunction with a data transfer in either direction between the host interface 240 and one of the mass storage controllers 220 or 230. The router 235 can incorporate control logic for such data transfers.

The host interface 240 provides a direct interface to the host bus 155, and can provide all support for the specific protocol in use on the host bus 155. The subsystem formed by the host interface 240, the disk controller 230 and the magnetic hard disk 225 as well as the subsystem formed by the host interface 240, the flash controller 220 and the flash memory array 215 both form complete mass data storage systems. The router 235 may pass data and control signals without modification from the host interface 240, or may establish an alternative protocol for communication with the controllers 220 and 230. Interfaces 260 and 265 between the router 235 and the mass storage controllers 220 or 230 may be a standard protocol, such as ATA, or may be a special interface defined for the improved mass storage device 150. Interfaces 260 and 265 are typically logical interfaces providing random read and write access to individual sectors of data in flash memory system 205 and hard drive 210 and are not dependent on the physical characteristics of the respective storage media.

In addition, the flash controller 220 might also support special commands or operations on interface 260 to give direct access to reserved areas of the flash memory array 215, which can be used for storage of tables and information logs used by the storage controller 245. Alternatively, the storage controller 245 might have its own non-volatile memory for such tables and logs.

The storage controller 245 is an intelligent control unit that directs the transfer of information between the host interface 240 and the mass storage controllers 220 and 230. The storage controller 245 coordinates the storage of data to or reading of data from the flash memory system 205 or the hard drive 210. The storage controller 245 maintains address tables for information stored in the flash memory array 215 and, in some embodiments, the magnetic hard disk 225 as well.

Volatile memory might act as a buffer or cache memory in many of the components of the improved mass storage device 150, including the host interface 240, the router 235, the flash controller 220 or the disk controller 230. Either a single volatile memory may be scheduled to operate in the various components, or separate volatile memories can be dedicated to each component.

Figure 2B:
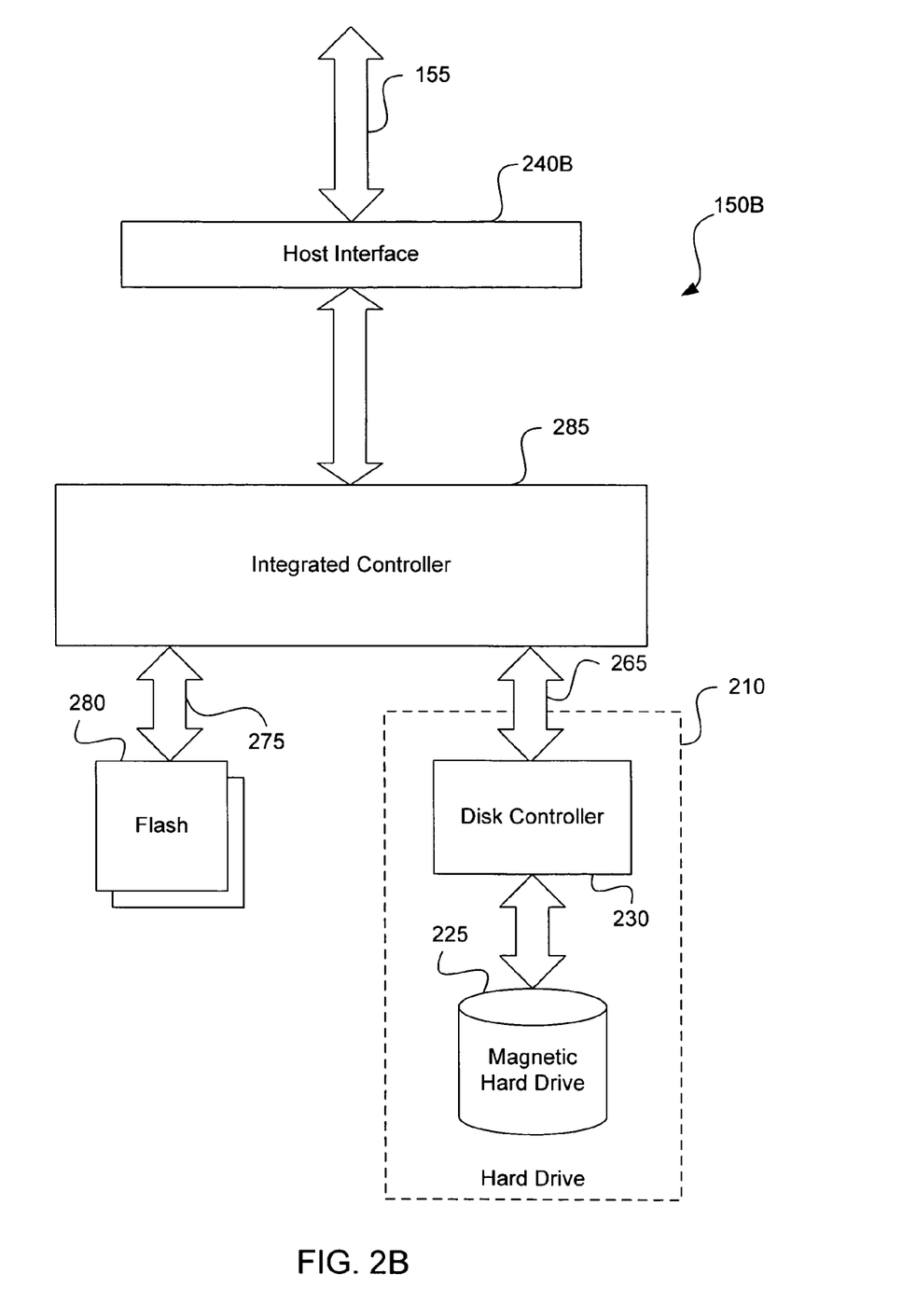
FIG. 2B depicts the improved mass storage device according to another exemplary embodiment of the present invention.

FIG. 2B depicts an alternative embodiment 150B of the improved mass storage device. Logical interface 260 is eliminated and is replaced by a physical interface 275 directly to a flash memory array 280. Direct control of the flash memory array 280 is implemented by integrated controller 285, which can perform the functions of both storage controller 245 and router 235. In this embodiment, the function of flash controller 220 is not required and flash memory array 280 does not form part of a logical data storage device, but is used directly as a physical store. It is particularly suited to temporary storage of streams of data.

Figure 3:
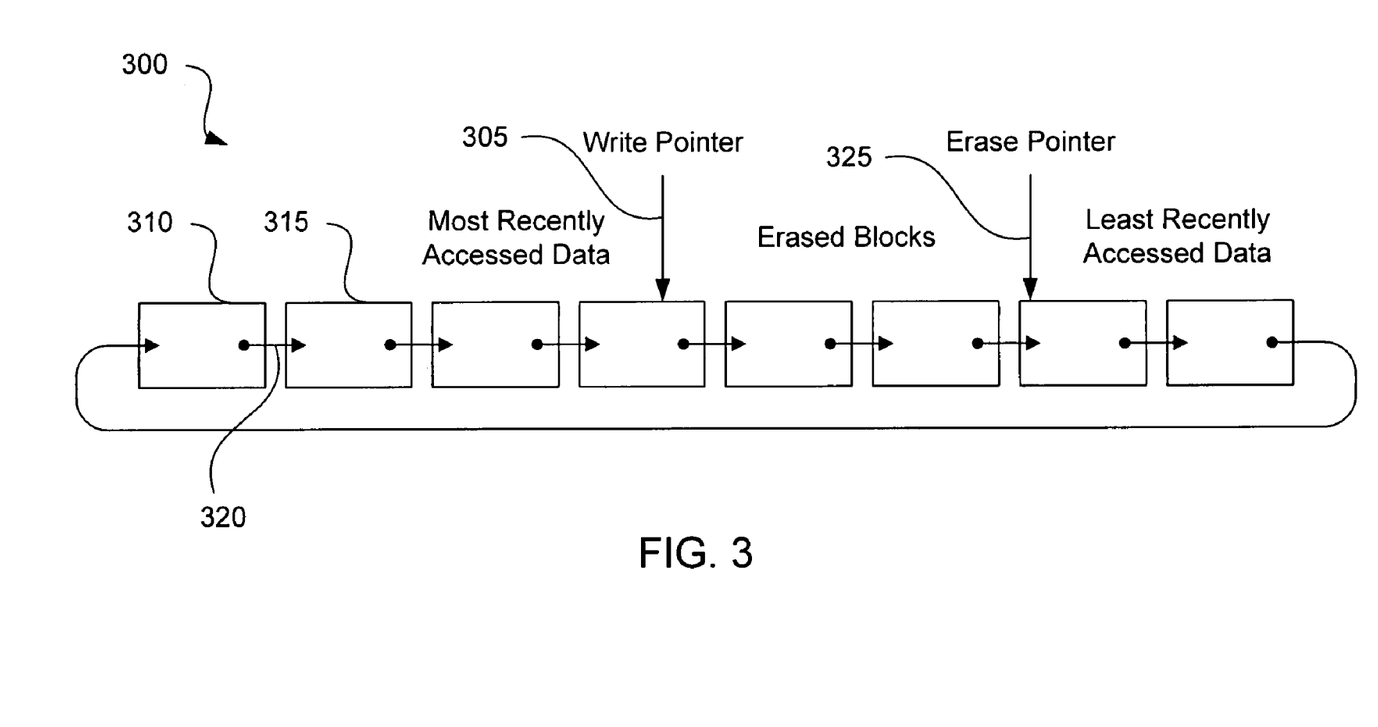
FIG. 3 depicts a stylized representation of a ring buffer.

FIG. 3 depicts one way of organizing storage of sectors in a stream of data in flash memory array 280, in the form of a ring buffer 300. The current location for writing a sector of data is defined by a write pointer 305, which moves clockwise in FIG. 3 through the address space in an endless cycle. The address space is defined by metablocks (e.g. 310 and 315), which are linked (e.g. 320) either in a pre-set order or in an order dynamically determined when write pointer 305 moves from a full metablock to a new erased metablock. An erase pointer 325 similarly moves clockwise in FIG. 3 through the address space in an endless cycle. Metablocks identified by erase pointer 325 are erased at a rate that ensures that a small pool of erased metablocks is maintained ahead of write pointer 305, for storage of new data sectors. Blocks being erased contain the least recently written data in ring buffer 300.

The improved mass storage device 150 can take advantage of its dual nature by using the flash memory system 205 as a read cache, which stores a copy of all data read from the magnetic hard drive 210. The flash memory system 205 may either have a region of its logical address space allocated as the read cache, or may be have its logical address space entirely devoted to the function. The location for storing cached data within the identified region of logical address space may be determined by an incrementing write address pointer defining a cyclic buffer, or may be a deterministic function of the logical address of the data within the magnetic hard drive 210.

Alternatively, in mass storage device 150B, ring buffer 300 may be used to store a copy of all data read from the magnetic hard drive 210, at locations defined by the write pointer. Recently read data is, therefore, always present in the ring buffer 300, while older data is erased when its associated metablock is identified by the erase pointer.

Alternatively, data being read from the disk device may be selectively copied to the read cache. This could be on the basis of the frequency with which the data is read, the nature of the file that is being read, or some other criterion.

In another embodiment, the improved mass storage device 150 can operate with its flash memory system 205 acting as a write cache. A cyclic buffer, similar to one previously described for the read cache, can be used to store data supplied from the host bus 155 in parallel with its writing to the hard drive 210. In this manner, incoming data can be stored in the improved mass storage device 150, allowing the system 100 to complete its write operation sooner than would otherwise be possible if the only mass storage device was a single magnetic hard drive 210. When data stops being sent over the host system bus 155, the CPU 140 can act as if the data has reached its final destination, even though the improved mass storage device 150 still needs to complete the transfer of data from the flash memory system 205 to the magnetic hard drive 210. The transfer will typically occur when the mass storage device 150 is not otherwise being used. However, if the flash memory system 205 has the capability to read and write during a single cycle (e.g., using a dual port memory structure), the transfer can occur during the writing to flash memory system 205.

Figure 4A:
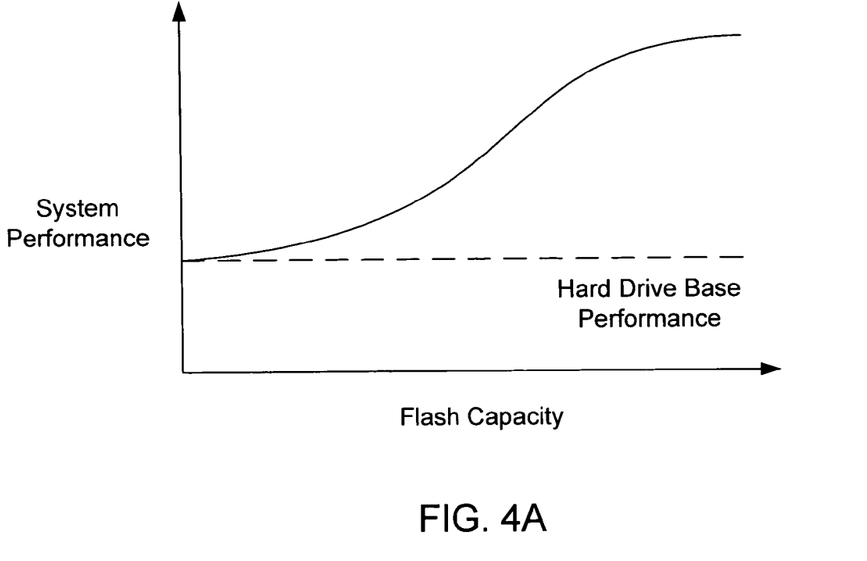
FIG. 4A depicts a graph illustrating system performance benefits as flash capacity increases.

The overall increase in system performance depends upon both the capacity of the flash memory system 205 and how often the improved mass storage device 150 is being accessed. A small capacity flash that does not qualify as a mass storage device would simply be the equivalent of a flash cache, and would not greatly improve the system performance. However, as the flash gets bigger, the system performance benefits get more drastic, as shown in FIG. 4A. The bigger the flash memory system 205, the more data can be stored during a burst of activity.

Figure 4B:
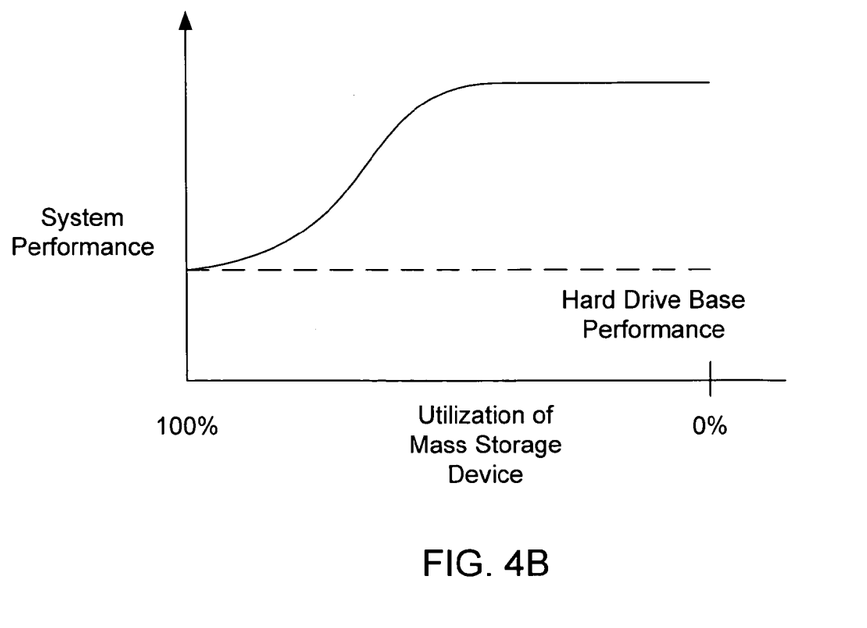
FIG. 4B depicts a graph illustrating system performance benefits as utilization of the improved mass storage device decreases.

Similarly, FIG. 4B shows that as the improved mass storage device 150 becomes more utilized, the system performance degrades. If the mass storage device flash memory system 205 to the hard drive 210. Eventually, the mass storage device 150 must stop using the flash memory system 205 and exclusively use the hard drive 210. If that happens, the system performance would be identical to a system that only used a hard drive 210.

As will be appreciated by those skilled in the art, the improved mass storage device 150 should have an error handling routine that enables data to be directed to the hard drive 210 while bypassing the flash memory system 205. If the flash memory system 205 becomes full, the improved mass storage device 150 cannot simply overwrite the flash memory system 205 until the data is successfully transferred to the hard drive 210. The same error handling routine could also be utilized if the flash memory system 205 is temporarily not available (e.g., the flash memory system 205 is engaged in a garbage collection process).

The write cache may exist independently of the read cache, occupying either a portion of the logical address space or the entire logical address space of the flash memory system 205, or it may coexist with the read cache.

Another manner in which the improved mass storage device 150 can operate is by exclusively using the flash memory system 205 in certain situations. For example, in some cases it might be desirable for a system to enter into a portable mode where the hard drive 210, which is more susceptible to shock, becomes unavailable. Unavailability might simply mean that data is not sent to the hard drive 210, that the hard drive 210 is shut off in order to conserve power, or that the hard drive 210 is physically removed from the improved mass storage device 150. If, for example, the hard drive 210 were part of a docking station for a portable device, then removing the portable device from the docking station would make the hard drive 210 unavailable.

Once the hard drive 210 became available again, the storage controller 245 would cause the two mass storage devices 205 and 210 to synchronize with each other. In the case of the portable device, the hard drive 210 would become available once the portable device was put back in its docking station. In other circumstances, the hard drive 210 might become available because motion detection circuitry determines that the system is no longer in danger of experiencing shock. In yet other circumstances, the user might cause the system to place the hard drive 210 into an available state by manually changing its mode, or perhaps plugging the system into an electrical outlet. In yet other circumstances, the system might simply re-active the hard drive 210 on its own in order to free up space in the flash memory system 205. In all cases, the flash memory system 205 can act as a temporary back-up since data exists in the flash memory system 205 until overwritten with new data.

Read caching, write caching, and exclusive storage can all be incorporated into the same device. In each situation the logical address space for the flash memory system 205 is a subset of the logical address space for the hard drive 210. In other words, when a data request comes from the host bus 155, the data request is associated with a single logical address. The most recent data that corresponds with that logical address can exist in the flash memory system 205, the hard drive 210, or both.

In some embodiments the portion of the flash memory system dedicated to a certain operation might change depending upon the situation. For example, if the hard drive 210 is physically unavailable during exclusive storage mode, there is no need to dedicate any of the flash memory system 205 to the caching operations during that mode. Once docked, the system could then revert to using the flash memory system 205 for cache purposes (read, write or both).

Although the invention has been described in its presently contemplated best mode, it is clear that it is susceptible to numerous modifications, modes of operation and embodiments, all within the ability and skill of those familiar with the art and without exercise of further inventive activity. For example, if certain programs are better suited to being permanently stored in the flash memory system, then no corresponding logical address would need be stored in the hard drive for those programs. Furthermore, other mass storage devices might use technology other than either flash or hard drives, and might include battery backed RAM, optical disks, ovonics unified memory (OUM), magnetic RAM (MRAM), ferroelectric polymer, ferroelectric RAM (FeRAM), silicon on insulator (Sol), etc. Accordingly, that which is intended to be protected by Letters Patent is set forth in the claims and includes all variations and modifications that fall within the spirit and scope of the claim.

What is claimed is:

1. A data storage system comprising:
    a first non-volatile mass storage device that can be placed in an available state and an unavailable state and having a first range of logical addresses;
    a second non-volatile mass storage device having a faster access time and a lower capacity than the first non-volatile mass storage device and having a second range of logical addresses; and
    a storage controller that can access data within the second non-volatile mass storage device when the first non-volatile mass storage device is in the unavailable state and operable to access data within both the first and second non-volatile mass storage devices when the first non-volatile mass storage device is in the available state;
    wherein the first range of logical addresses and the second range of logical addresses are overlapping with each other.

2. The data storage system of claim 1, wherein the unavailable state is activated when the data storage system enters a portable mode.

3. The data storage system of claim 2, wherein the portable mode is determined with motion detection circuitry.

4. The data storage system of claim 1, wherein a portion of the second range of logical addresses is non-overlapping with the first range of addresses, whereby the portion of the second range of addresses contains data that does not also reside on the first non-volatile mass storage device.

5. The data storage system of claim 1, wherein the storage controller synchronizes the data contained in the second range of addresses on the second non-volatile mass storage device with the first range of addresses on the first non-volatile mass storage device after the first non-volatile mass storage device transitions out of the unavailable state to the available state.

6. The data storage system of claim 1, wherein the second non-volatile mass storage device is capable of acting as a cache for the first non-volatile mass storage device when the first non-volatile mass storage device is in the available state.

7. The data storage system of claim 1, wherein the first non-volatile mass storage device uses a magnetic hard disk to store data and the second non-volatile mass storage device uses a flash memory array to store data.

8. A data storage system comprising:
    a first non-volatile mass storage device that has a first range of logical addresses;
    a second non-volatile mass storage device having a faster access time and a lower capacity than the first non-volatile mass storage device and having a second range of logical addresses, the first range of logical addresses and the second range of logical addresses overlapping with each other; and
    a storage controller that directs incoming data into either the first non-volatile mass storage device or the second non-volatile mass storage device;
    wherein after data has been directed into the second non-volatile mass storage device, the data is copied from the second non-volatile mass storage device into the first non-volatile mass storage device; and
    wherein the storage controller's choice of which non-volatile mass storage device to direct incoming data into is at least partially dependant upon the amount of data in the second non-volatile mass storage device that has not been copied into the first non-volatile mass storage device.

9. The data storage system of claim 8, wherein the data is copied from the second non-volatile mass storage device into the first non-volatile mass storage device during periods of inactivity.

10. The data storage system of claim 8, wherein:
    the second non-volatile mass storage device experiences periods of inaccessibility; and
    the storage controller directs data into the first non-volatile mass storage device when the second non-volatile mass storage device is in a period of inaccessibility.

11. The data storage system of claim 10, wherein the periods of inaccessibility are caused, at least in part, by garbage collection operations.

12. The data storage system of claim 10, wherein data in the second non-volatile mass storage device is stored in a cyclic buffer arrangement.

13. The data storage system of claim 8, wherein the first non-volatile mass storage device uses a magnetic hard disk to store data and the second non-volatile mass storage device uses a flash memory array to store data.

14. A data storage system comprising:
    a first non-volatile mass storage device that has a first range of logical addresses;

a second non-volatile mass storage device having a faster access time and a lower capacity than the first storage device and having a second range of logical addresses, the first range of logical addresses and the second range of logical addresses overlapping with each other; and a storage controller that satisfies data requests with data that is stored in the second non-volatile mass storage device or, if the requested data is not present in the second non-volatile mass storage device, with data that is stored in the first non-volatile mass storage device.

15. The data storage system of claim 14, wherein data is copied from the first non-volatile mass storage device to the second non-volatile mass storage device according to frequency with which the data is read.

16. The data storage system of claim 14, wherein data is copied from the first non-volatile mass storage device to the second non-volatile mass storage device according to the nature of the data that is being read.

17. The data storage system of claim 14, wherein data in the second non-volatile mass storage device is stored in a cyclic buffer arrangement.

18. The data storage system of claim 14, wherein the first non-volatile mass storage device uses a magnetic hard disk to store data and the second non-volatile mass storage device uses a flash memory array to store data.

* * * * *

UNITED STATES PATENT AND TRADEMARK OFFICE
CERTIFICATE OF CORRECTION

PATENT NO. : 7,136,973 B2
APPLICATION NO. : 10/772855
DATED : November 14, 2006
INVENTOR(S) : Alan Welsh Sinclair Page 1 of 1

It is certified that error appears in the above-identified patent and that said Letters Patent is hereby corrected as shown below:

Column 5, line 11, change "receritly" to --recently--.

Column 8, line 25, add --150 is constantly accessed, there will not be enough time to transfer the data from the -- after "device"

Signed and Sealed this

Twenty-first Day of August, 2007

JON W. DUDAS
*Director of the United States Patent and Trademark Office*